April 5, 1955 W. L. INGLETT 2,705,607
BAGGING METHOD
Filed June 12, 1953 5 Sheets-Sheet 1

INVENTOR.
WILFRED L. INGLETT,
BY
ATTORNEY

April 5, 1955     W. L. INGLETT     2,705,607
BAGGING METHOD
Filed June 12, 1953     5 Sheets-Sheet 2
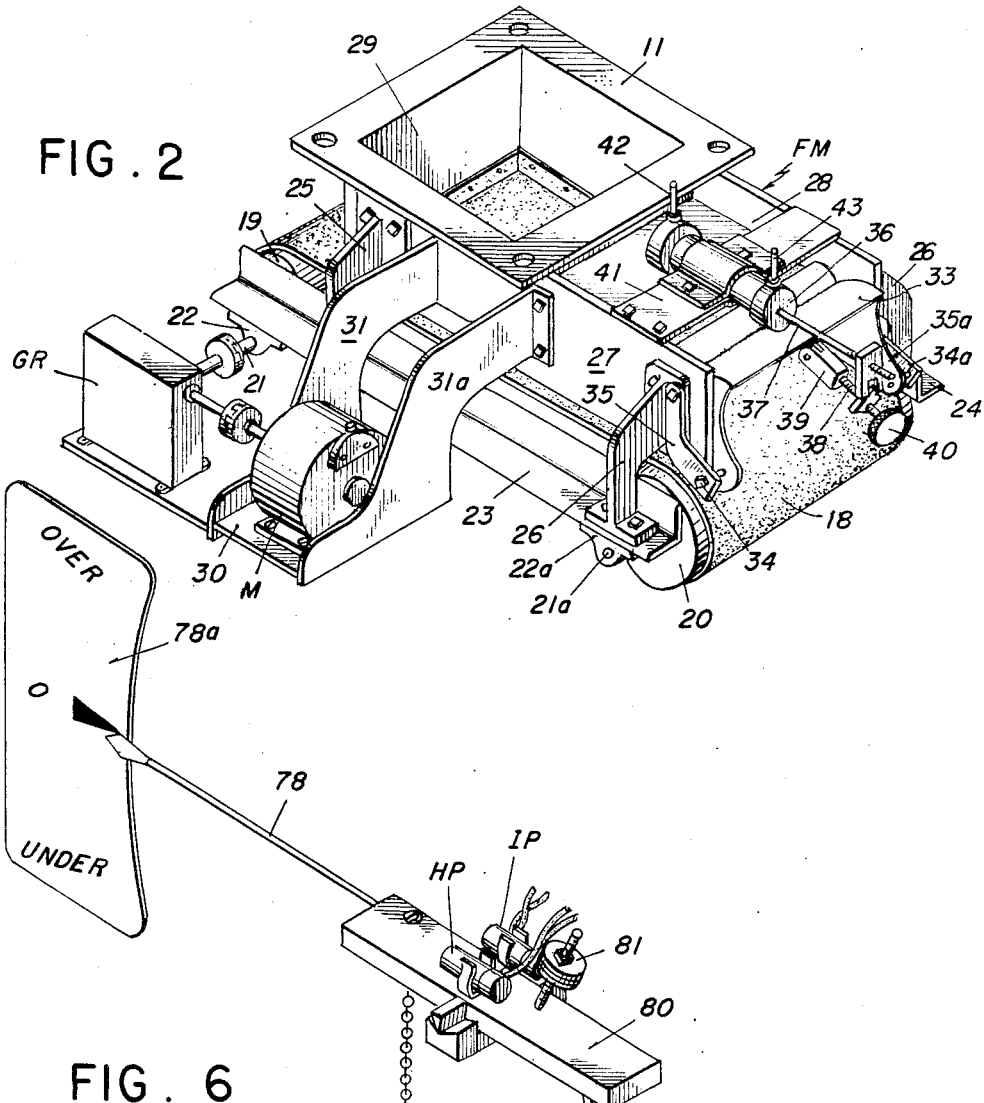
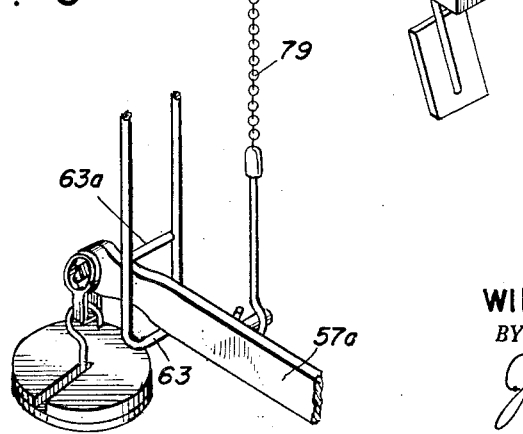
INVENTOR.
WILFRED L. INGLETT,
BY
ATTORNEY April 5, 1955   W. L. INGLETT   2,705,607
BAGGING METHOD
Filed June 12, 1953   5 Sheets-Sheet 3
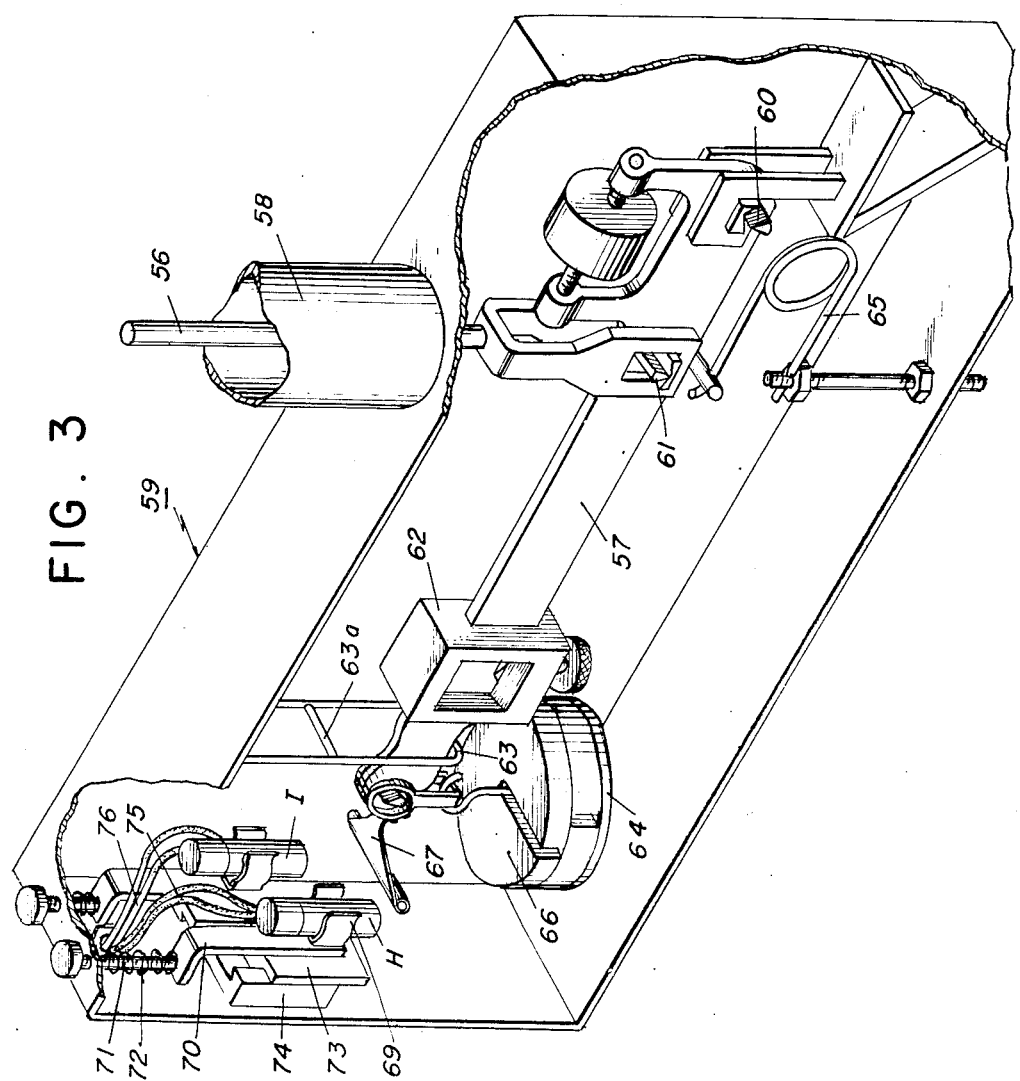
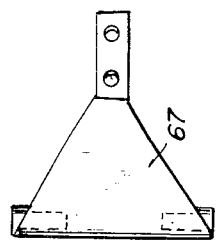
INVENTOR.
WILFRED L. INGLETT,
BY
ATTORNEY

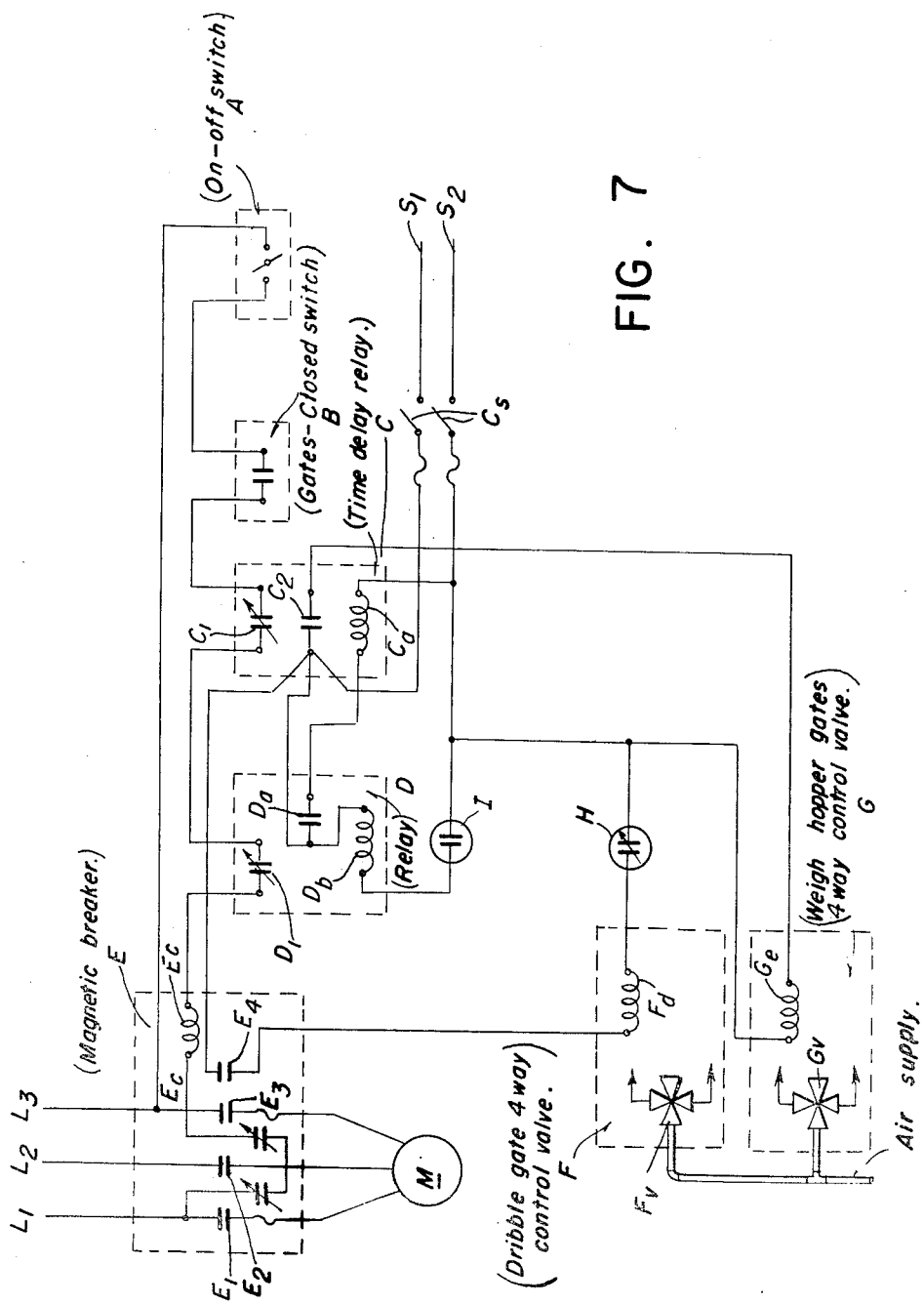

April 5, 1955
W. L. INGLETT
2,705,607
BAGGING METHOD
Filed June 12, 1953
5 Sheets-Sheet 5
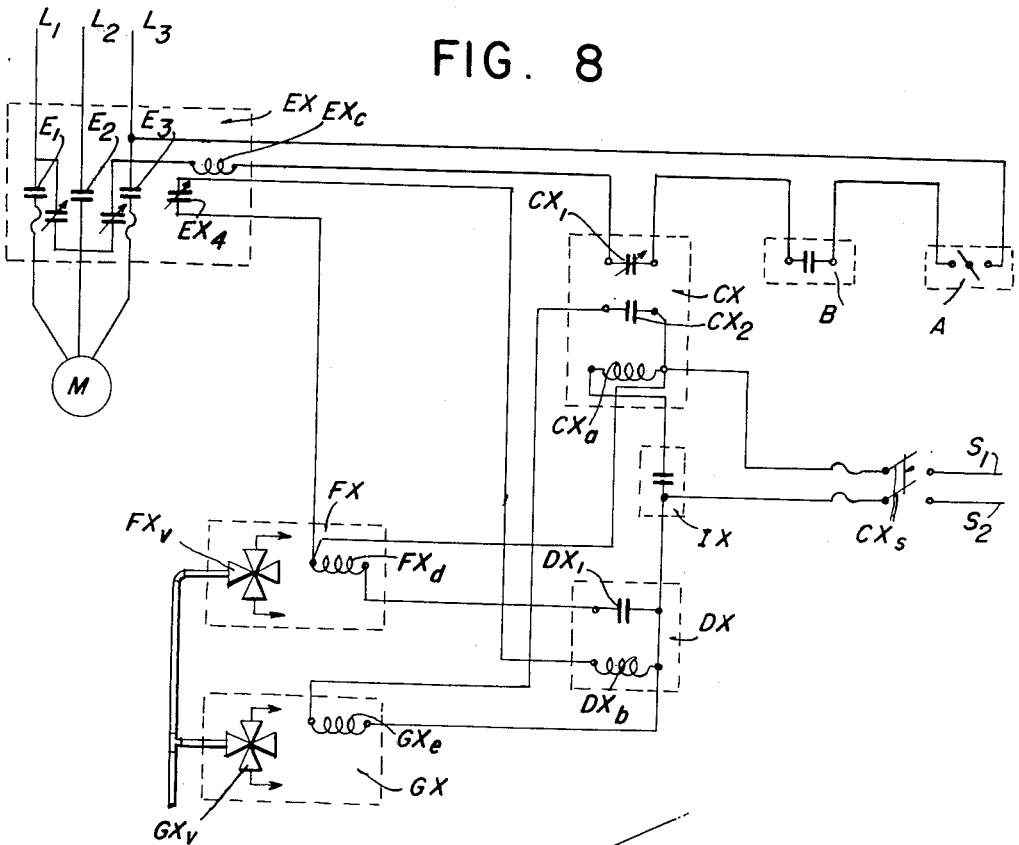
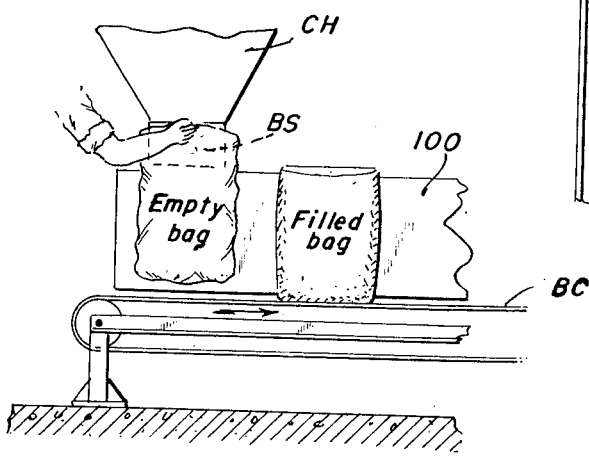
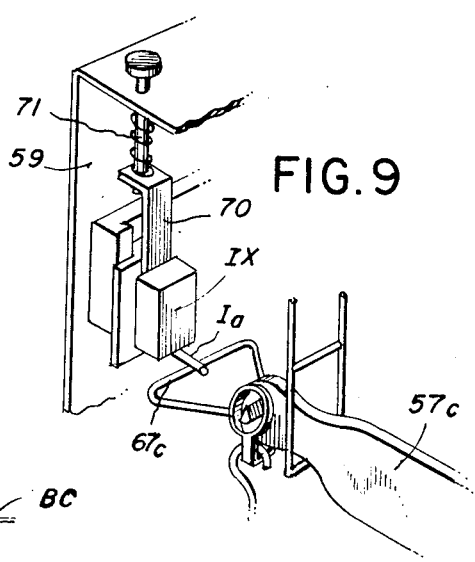
INVENTOR.
WILFRED L. INGLETT,
BY

United States Patent Office 2,705,607
Patented Apr. 5, 1955

2,705,607

BAGGING METHOD

Wilfred L. Inglett, Augusta, Ga., assignor to Inglett & Corley, Inc., Augusta, Ga., a corporation of Georgia Application June 12, 1953, Serial No. 361,203

10 Claims. (Cl. 249—45)

This invention relates to improvements in methods of bagging bulk materials, such as fertilizers, dry chemicals, flour, feed, meals, cement, concrete mixes, pigments, pulverized minerals, etc., as the term "bagging" as employed herein is broadly defined as the operation of depositing an accurate weight of such materials in a bag or sack.

Prior bagging methods and the apparatus employed in their practice are open to numerous objections, principal of which are that they are slow and they do not supply an accurate weight of the material to the bag. For example, in so-called "hand bagging" as is widely practiced, the operator is required to clamp the bag or sack to the scale so that it provides the weight receptacle, to manually release the material from a hopper into the bag or sack until a weight somewhat under the desired weight is deposited, to complete the weighing operation by "dribble" feeding the material under hand control into the bag until the scale comes into balance, and, finally, to unclamp the filled bag or sack from the scale and lower it on to a surface such as a moving conveyor. By this method, bagging at the relatively slow rate of seven to eight 100-lb. bags per minute (168–192 tons per 8-hour day) can be attained by the scale operator under ideal conditions, but the average, particularly when a material such as fertilizer is being bagged, is substantially under that figure. Moreover, experience has shown that when attempt is made to speed up this slow bagging rate, such occurs at the sacrifice of accurate weight, due to the physical inability of the operator to carry out the numerous manual operations involved during each weighing cycle at the faster rate, or to the operator becoming careless when working under such conditions.

More recently, various bagging methods employing automatic weighing apparatus have come into use, but, speaking generally, such have not effected any appreciable speeding up of the slow bagging rate characterizing the old manual method. Moreover, such apparatus are notoriously incapable of supplying accurate weights of material to the bags or sacks being filled, with the result that substantial overweights were supplied, thus to avoid the possibility of penalties being imposed due to underweight bags or sacks, the producer of the bagged material thus, during the course of a year's operation, suffering substantial financial loss. The producer of overweight sacks is also likely to run afoul of the overweight regulations governing public carriers which exist in many States. For example, two pounds of excess weight per bag in a cargo of five hundred bags represents a total overweight of one-half a ton over the declared cargo weight, and hence subject to fine imposed by highway authorities, for example. Again, in the case of the material being bagged having corrosive and/or hydroscopic properties such as fertilizer, maintenance of the prior automatic weighing and bagging equipment in good working condition for any substantial period of time created numerous difficulties.

At least one of the bagging methods in wide use and which employs the automatic as distinguished from the manual weighing apparatus for its practice requires a special type of bag or sack characterized by an internally opening spout which is automatically closed following its filling upon the bag being turned over. For the producer who is constrained by the nature of his product or by choice to use the conventional open-mouth bag or sack, this method is of course not acceptable.

Broadly stated, a principal object of the present invention is the provision of a bagging method which makes possible the bagging of bulk or dry materials in bags or sacks at a substantially faster rate and with greater accuracy in the weight of the material supplied to the bags than was heretofore possible of attainment by any of the prior bagging methods.

Another object of the invention is the provision of a bagging method which is exceptionally fast and gives more accurate weights as compared to the prior methods and which is further characterized in that accuracy in weight does not depend on the speed of bagging, which is in sharp contrast to some of the prior bagging methods.

Yet another object of the invention is the provision of a bagging method which is faster and gives more accurate weights than the prior methods, and which at the same time is so flexible that it may be applied to the bagging of material in sacks or bags of the 5-lb. size up to any size of bag reasonably used to bag bulk materials of the character specified, for example, up to 200-lb., and which further not only requires no special construction of bag, but, on the other, permits the use of conventional open-mouth bags made of cotton, jute or paper, and which further permits the use of bags of different sizes (makes) for the same weight of material.

A further object of the invention is the provision of a bagging method characterized as in the foregoing which reduces labor costs to a minimum, in that only a single operator is required, while at the same time simplifying the operator's duties to the extent that he is required only to open the bags to be filled and place them on a spout, there being no requirement for the operator to clamp the bag to the scale prior to each weighing operation, to unclamp and thereupon lower the filled bag following such operation, and/or to handle the filled bag in any way.

A still further object of the invention is the provision of a bagging method characterized as in the foregoing, in which the weighing apparatus employed in its practice "paces" the operator rather than the operator "pacing" the apparatus, while at the same time enabling the operator comfortably to perform successive bagging operations with difficult-to-handle materials, such as fertilizer, at the rate of twenty 100-lb. bags per minute, i. e., a 3-second cycle per each complete bagging operation, and at an even faster rate in the case of 200-lb. bags or sacks.

A further practical object of the invention is the provision of a high-speed bagging method which is so fast in its operation as to answer the production problems of the producer putting out a seasonal product requiring high-speed production during his "rush" season or seasons, and who otherwise would be called upon to hire extra help and to work them over-time in order to meet his production schedule.

In its apparatus aspects, and considered broadly, the invention contemplates and aims to provide improved weighing and bagging apparatus capable of depositing accurate weights of material into a bag or sack in completely automatic manner and at a bagging rate which may comfortably be that of one 100-lb. sack per 3-second cycle, or one 200-lb. sack per 5-second cycle, with materials difficult to handle, such as fertilizer, and at even faster rate with the easier-to-handle materials.

Another object of the invention is the provision of automatic weighing and bagging apparatus characterized as aforesaid, which is further characterized by simple design and low cost construction, and which is easy to maintain, while at the same time being thoroughly dependable in operation.

Yet another object of the invention is the provision of of automatic weighing and bagging apparatus characterized as in the foregoing, which is adjustable to different weights of material, to different weight bags, and to different sizes and makes of bags for the same weight.

A further object of the invention is the provision of automatic weighing and bagging apparatus as aforesaid, incorporating novel means for insuring accurate weight of material at the high-speed bagging rate attainable thereby, but whose operation is entirely independent of such bagging rate; that is to say, weighing apparatus whose accuracy in weight supplied does not depend on the time cycle to which the machine is set, which later may be varied in accordance with the requirements of the particular producer, or with the nature of the material being bagged, or with the size of bag or sacks being filled.

Other objects and advantages of a bagging method and apparatus employed in the practice thereof according to the invention will appear from the following detailed description, reference being had to the accompanying drawings illustrating the various possible forms and operations of such apparatus, in which Fig. 1 is a perspective broken-away view illustrating the main structural parts, and their relationships, of bagging apparatus according to the invention;

Fig. 2 is a perspective view of the feeder component of the apparatus shown in Fig. 1, the view illustrating the feeder means disconnected from the supply bin and the "dribble" gate in its normal or full-raised position;

Fig. 3 is a perspective view looking into the scale beam box from the right side thereof (Fig. 1) the view further illustrating the preloading and counterweighting means and the electrical control components associated with the scale beam as employed in one form of operation of the material weighing means forming a part of the weighing and bagging apparatus as illustrated in Fig. 1;

Figs. 4 and 5 are enlarged plan and side-edge views, respectively, of the magnetic head attachment for the scale beam as illustrated in Fig. 3;

Fig. 6 is an enlarged broken-away view of the scale beam and an associated "over-and-under" weight indicating means which provides the same operation of the weighing means as characterizes the Fig. 3 form of controls;

Fig. 7 is a wiring diagram illustrating the circuitry employed in operating and re-cycling the weighing and bagging apparatus shown in Fig. 1 in accordance with scale beam movement, the associated controls being of the type illustrated in Figs. 3 and 6;

Fig. 8 is a wiring diagram illustrating the circuitry employed in operating and re-cycling said weighing and bagging apparatus under a variant form of control;

Fig. 9 is an enlarged detail view of a scale beam and associated electrical control means as employed for the variant form of control exemplified by the circuit illustrated in Fig. 8; and Fig. 10 is a schematic view illustrating the simplified procedure entailed in placing a bag on a spout according to the bagging method of this invention.

Figure 1:
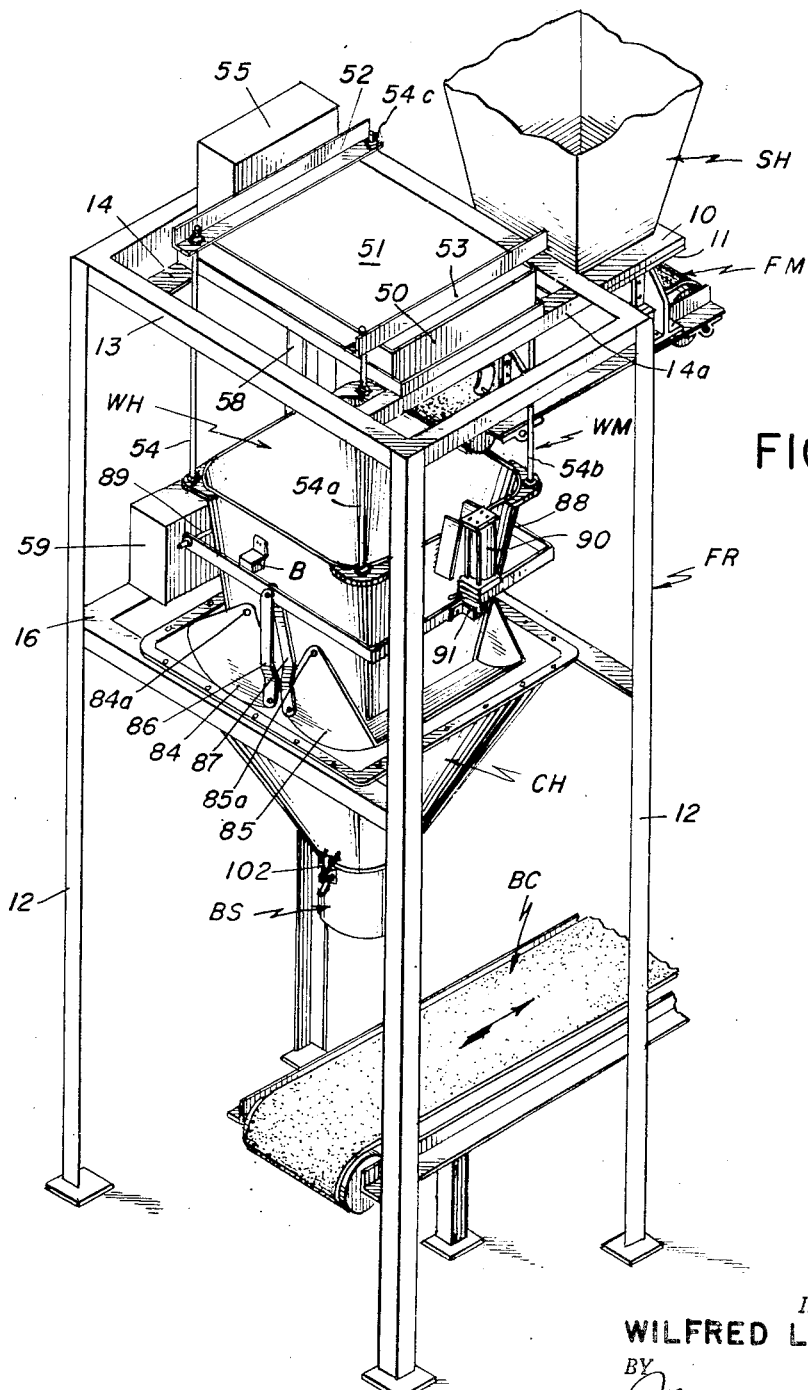

As the improved bagging method of the invention will be more readily perceived and appreciated on the basis of an understanding of the apparatus for carrying out the same, the latter will first be described.

As seen in Fig. 1, such apparatus generally comprises an overhead supply hopper SH which delivers the material to be weighed contained in an overhead bin (not shown) to a feeding means FM, the latter feeding the material to a weighing means WM including a weigh hopper WH, which latter dumps to a chute CH and thence through an open-ended bag spout BS to a bag or sack placed on said spout. As will be later explained, the bag spout is arranged at a predetermined level above a bag conveyor BC on to which the bag drops under the weight of the material striking and depositing in the bag. It will be observed that one end of the bag conveyor BC extends well under the bag spout so as to insure the bag dropping on to the conveyor.

All of said parts or mechanisms referred to above, with the exception of the supply bin and its hopper SH, the feeding means FM and the bag conveyor BC, are supported by a main frame FR. Said supply bin and its hopper are usually supported by their own supporting means, and preferably the feeder means FM comprises a self-contained assembly unit which is attached as such to the supply hopper SH, as by bolts passing through a horizontal flange 10 extending all around the discharge end of said hopper, and a mating flange 11 extending all around the receiving space of the feeding means FM, to be described. The bag conveyor BC is provided with its own support, such as legs which support it at a predetermined level above the floor, although this level will vary with particular installations and may be floor level.

Preferably, the illustrated main frame FR is of simple angle-iron construction and comprises four upright corner angles 12 functioning as legs, a skeleton top frame 13 having intermediate cross angles 14, 14a, from which the weighing means is supported as will be described, and an intermediate level frame 15 to which the chute is affixed along its upper edge, so that the chute extends downwardly into the frame enclosure. While the illustrated frame is floor-supported, it may, instead, be suspended from above if the building in which the apparatus is installed is so constructed as to provide the overhead support. To provide for varying level of the bag conveyor BC, as is sometimes necessary because of low head room, or in the case of an existing conveyor already mounted at floor level, the frame legs may be provided with means (not shown) for adjusting them vertically, and hence for adjusting the level of the bag spout BS.

The illustrated feeding means FM is preferably of the general type disclosed in my prior application Serial No. 155,158, filed April 11, 1950, and accordingly comprises a horizontaly arranged endless feeder belt 18 (Fig. 2) traveling on spaced rollers 19, 20, of which the roller 19 is powered by an electric motor M driving said roller through a gear reduction GR. Said rollers are mounted on cross shafts 21, 21a journaled in bearings 22, 22a which are preferably affixed to the under faces of the horizontal flanges of the feeder side frames 23, 24 and which are preferably fashioned from simple angle-irons having their horizontal flanges oppositely disposed as illustrated. The side frames 23, 24 each mount brackets 25, 26 adjacent their ends, the brackets of one side frame being oppositely disposed to the brackets of the other side frame, as shown. The aforesaid brackets mount upright side plates 27, 28, whose lower edges are spaced a clearance distance above the upper surface of the feeder belt 18, and which are spaced a small distance inwardly from the outer side edges of the belt. A transverse end plate 29 connects the rear ends of the side plates 27, 28 and forms therewith a material-receiving space which is closed on three sides and open on the side which faces the discharge end of the belt. The aforesaid attaching flange 11, by which the feeder means is secured as a unit to the supply hopper SH, is affixed along its three sides to the upper edges of the side plates 27, 28 and the rear plate 29, and has a fourth side portion extending between said side plates as illustrated. It will also be seen, by reference to Fig. 2, that the motor M which drives the feeder means, as well as the gear reducer GR, interposed between the motor and the powered shaft 19, are both carried on a supporting frame 30 affixed to one of the side plates (illustratively the side plate 27) by means of suitable brackets 31, 31a. In a feeder-means as described, material received on the rear or drive end of the feeder belt 18 is conveyed towards its other or discharge end, over which it spills and falls by gravity. It will be observed that, due to the appreciable length of the conveyor belt, its discharge end is disposed laterally of the axis of the supply hopper SH, so that the fall of the material from the discharge end of the conveyor belt is wholly unaffected by the weight or head of the material contained within the supply bin and its supply hopper SH.

According to the invention, the feeder means FM incorporates a so-called "dribble" gate 33 for controlling the volume of material falling from the feeder belt 18. Said gate is shown to be of generally arcuate formation and is mounted to swing counter-clockwise from a normal raised position in which is passed a full volume of material, to any desired lowered position or to a fully lowered position in which its inner lower edge may engage against the upper surface of the feeder belt 18 adjacent its discharge end. Said gate turns on pivots 34, 34a journaled in brackets 35, 35a which are bolted or otherwise secured to the side plates 27, 28, or to the end brackets 26 which support the side plates from the side frames 23, 24. The dribble gate 33 is actuated from its normal raised to its lowered position or positions, and vice versa, by means of a double-acting air cylinder 36 whose piston rod 37 (shown as projecting over the discharge end of the belt) is connected by suitable linkage 38 to a clevis 39 pivotally connected to the upper edge of the dribble gate, as shown. An adjusting screw 40 operates through said linkage to vary the throw of the dribble gate for purposes to be later explained. As also seen in Fig. 2, the air cylinder 36 is assembled to the feeder means, illustratively being affixed to a mounting bracket 41 extending between and secured to the feeder side plates 27, 28. Compressed air is supplied to one or the other ends of the air cylinder 36 through an electrically operated four-way control valve FV (schematically shown in Fig. 7) through ports 42, 43 in accordance with the control requirements of the apparatus, as will be described. For purposes to be explained, said control valve is normally held in a position such that it feeds air to the "gate-lowered" end of the air cylinder 36.

As forecast above, the weighing means WM is supported from the skelton top frame 13 of the main frame FR. Preferably, the weighing means employ as its scale a commercial flat-bed scale so adapted or modified that the connecting rod between platform and scale beam extends downwardly with respect to the bed rather than upwardly, and moves axially upwardly with weight rather than axially downwardly, as usual. As seen in Fig. 1, depicting such an arrangement, reference numeral 50 designates the bed or base of such a scale supported on and affixed to the cross angles 14, 14a of the top frame 13, so as to dispose the scale platform 51 upwardly as usual. Spaced cross-angles 52, 53 of length as to extend beyond the sides of the scale bed are affixed as shown to the scale platform, and to their extending ends are affixed four downwardly extending vertical rods 54—54c, which are connected at their lower ends to the four corners of the weigh hopper WH, thereby suspending the latter from the scale platform 51. The scale bed 50 also mounts a scale-beam transfer box 55 housing the transfer linkage (not shown) between platform 51 (Fig. 1) and the connecting rod 56 extending to the scale beam 57 (Fig. 3), the connecting rod being centered in a tubular housing 58 affixed both to the transfer box 55 and to the scale-beam box 59 which houses the scale beam 57 and associated parts to be described. The scale beam box 59 is supported on the intermediate level frame 15 of the main frame FR, which is generally that of the weigh hopper WH, thus to be readily accessible.

To adapt the scale beam connecting rod 56 for upward axial movement with weight, the aforesaid transfer linkage between scale platform 51 and connecting rod 56 is appropriately reversed so that it exerts upward pull on the connecting rod with lowering of the scale platform 51. Also, the point of connection between connecting rod and scale beam 57 as well as the fulcrum for the latter are reversed as compared to the usual arrangement, so as to render the action of the scale beam that of a so-called "third type lever." Such as illustrated in Fig. 3, wherein it will be observed that the scale beam 57 is fulcrumed at one end on pivot 60, with the effort of the scale beam connecting rod 56 being applied to the scale beam at a point represented by pivot 61 which is intermediate its fulcrum point and its other end which carries the weight or resistance to be overcome, as represented by the poise 62.

As also seen in Fig. 3, the scale beam therein illustrated carries at its other or free end which moves angularly between stops 63, 63a as usual, a so-called "tare weight" 64, and it is further acted upon by a preloading spring 65 disposed to exert an upward force on the beam and a spring counter-balancing weight 66 conveniently superimposed on the tare weight 64, the purpose of which will be later explained in connection with one mode of operating the weighing mechanism according to the present invention. At its free end, the scale beam 57 mounts a magnetic head 67, illustrated in detail in Figs. 4 and 5 and which, when the scale partakes of its upward movement, is adapted successively to engage magnet-operated mercury switches H and I, of which switch H is a normally closed switch and is opened when engaged by the magnetic head 67, and switch I is a normally open switch which is closed by engagement of said head.

The vertical elevation of the switches H and I is adjustable so as to vary the timing of opening of switch H and closing of switch I. Since the mounting of the switches providing for such adjustment is the same for both, only the mounting of switch H will be described, it being understood that such is illustrative only, as other switch mountings may be substituted. As seen in Fig. 3, the switch H is carried by spring clips 69 affixed to the vertical leg of an L-shaped strap 70, into the horizontal leg of which is threaded an adjusting screw 71 whose upper headed end projects through the top wall of the scale beam box 59 so that its head is readily accessible for turning. A coil spring 72 is disposed in encircling relation on the screw 71 and is reactive between the under surface of said top wall and the upper surface of the horizontal leg of the strap 70. Said strap is affixed to a slide 73 which is vertically movable in the slideway therefor provided in a block 74 secured to the end wall of the scale-beam box 59 adjacent the weight-carrying end of a scale beam 57, thus to position the switch H so that it is influenced by the magnetic head 67 upon the scale beam 57 arriving at a predetermined point in the course of its movement, as established by the level to which the switch is adjusted by turning of the adjusting screw 71.

Supply and return conductors generally designated 75, 76 are connected to the mercury switches H and I, passing through an opening in the end wall of the scale beam box 59 to a junction box (not shown) preferably mounted on the associated end of the scale beam box externally thereof.

As will appear from the description to follow, microswitches operated directly by the scale beam 57, i. e. through a pin or bar affixed to said beam, or simple tilt-type mercury switches carried by the scale beam, may be substituted for the magnet-operated mercury switches H and I and the magnetic head 67 as described.

In installations wherein it is desirable to give visible indication of weight, control switches corresponding to the aforesaid magnet-operated mercury switches H and I, but of the simple tilt-type form of mercury switch, may be mounted on the pointer 78 of an "over and under" type indicating means associated with the scale beam, as is well known in certain types of automatic scales. Such an arrangement is illustrated in Fig. 6, wherein the pointer 78 of said indicating means is connected as by a chain 79 with the scale beam 57a so as to move proportionally therewith. The mercury switches HP and IP are shown to be mounted in suitable clips carried by a lever extension 80 of the pointer 78, said lever extension carrying adjusting weights 81 for adjusting movement of the pointer 78 so that it accurately follows scale-beam movement. As with the switch control arrangement illustrated in Fig. 3, the control exercised by the mercury switches HP and IP illustrated in Fig. 6 will be explained later.

The weigh hopper WH is disposed below the discharge end of the feeder belt 18 of the feeding means FM so as to receive the material falling therefrom by gravity. The weigh hopper is of substantially straight-sided and open-ended construction and its bottom open end is normally maintained closed by means of a pair of oppositely acting hopper gates 84, 85 of clam-shell construction and which are adapted to be actuated to their open position at a fast rate, thus to dump the contents of the weigh hopper in the form of a fast moving slug through the chute CH and bag spout BS. To this end, the gate 84 turns on horizontal pivots 84a carried by the weigh hopper, and the gate 85 turns on horizontal pivots 85a similarly carried by the weigh hopper. The aforesaid gates 84 and 85 are connected at points adjacent their meeting edges through toggle links 86, 87 with a generally horizontally arranged and U-shaped gate-operating beam 88, the ends of the side arms of which are journaled for angular movement on a cross shaft 89 which may be affixed as by welding to the weigh hopper. The described arrangement is such that, as the beam 88 is actuated downwardly about the axis of the beam shaft 89, the gates 84, 85 are swung outwardly at a fast rate, thus to dump the contents of the weigh hopper at a correspondingly fast rate. Conversely, when the beam 88 is actuated in upward direction, the gates are actuated from their open to their closed position, in which they together form a bottom for the weigh hopper capable of supporting the weight of the material depositing therein.

The gate-operating beam 88 is positively actuated in the required direction to open and close said gates as by means of a double-acting air cylinder 90 whose piston rod is connected to the beam by means of a connection generally indicated at 91. Compressed air is supplied from a source thereof through an electrically-operated four-way control valve GV, schematically illustrated in Fig. 7, to one or the other ends of the cylinder through ports designated 92, 93. Preferably, said valve is biased to a position in which it normally feeds air pressure to the "gates-closed" end of the air cylinder 90, thus to insure the hopper gates 84, 85 moving to closed position when the compressed air to the system is turned on following a period of shut-down. A normally open micro-switch designated B, whose purpose and functioning will be later explained, is shown to be affixed to the side of the weigh hopper WH in position to be engaged and thereby closed by the beam 88 when the latter is in or is actuated to its raised or "gates-closed" position.

According to the invention, the above described assembly of feeding means FM with its dribble gate 33, scale and its accessory controls depending on scale beam movement, and quick-dumping weigh hopper WH are combined in such manner not only to deposit an exceptionally accurate weight of material in a bag positioned to receive same from the bag spout BS, but also to complete each weighing and dumping operation in a minimum of time, which may comfortably be two seconds for 100 lb. weights of material difficult to handle, such as fertilizer, and less for the more easily handled materials. Since such desirable features depend in part on the close control of the feeding means and its dribble gate exercised through the scale beam 57, in accordance with the weight of the material depositing in the weigh hopper, such control action will first be described.

Following the teaching of my aforesaid application Serial No. 155,158, the preloading spring 65 effects preloading (underweighting) of the scale beam 57 by an amount such that the beam begins its movement from out-of-balance position determined by the lower stop 63 (Fig. 3) substantially earlier in terms of deposited weight than would normally occur according to the usual scale adjustment. For example, whereas the "breaking point" (i. e. instant at which the scale beam begins to move) of a scale beam set to balance at 100 lbs. of deposited weight is about 97 or 98 lbs. of actual weight deposited, a preloading spring adjusted to exert 30 lbs. of force (in terms of weight) on the scale beam in opposition to the resistance of its movement exerted thereon by the poise 62 set at the 100 lb. mark, will begin to move to its balance position upon the deposition of 70 lbs. of weight in the weigh hopper. While the degree of preloading effect exercised by the preloading spring 64 as aforesaid may vary, it is always, in terms of pounds, at least as great as, and preferably greater than, the calculated weight of material in suspension between the discharge end of the feeder belt 18 and the weight hopper at any instant.

Also in accordance with the teaching of my prior application, the counterweight 66 is calibrated to apply a force on the scale beam which exactly equals that exerted thereon by the preloading spring 64 when the beam is in balance. Such results in the scale beam, despite its preloading, being in balance position under both the no-load condition (weigh hopper empty) and upon the deposition of weight in the hopper corresponding to the setting of the poise 62, i. e. 100 lbs. of weight if the poise is set at the 100 lbs. marking. As also explained in my prior application, the preloading and counterweighting of the scale beam as aforesaid has the further effect of increasing the mass of the scale beam, as results in the beam, once its movement is initiated (at the earlier breaking point of 70 lbs. of deposited weight), moving to balance position at a slower than normal rate, this resulting from the fact that the magnitude of the angular movement of the scale beam 57 from lower stop 63 to balance position is the same, regardless of whether it moves slow or fast.

The aforesaid slow rate of movement of the scale beam 57, as compared to its normal fast rate of movement under the condition of its breaking point occurring at 97 or 98 lbs. of deposited weight, makes it possible to accurately time the operation of a device or devices, such as the mercury switch H, to occur at any desired instant during the travel of the scale beam. Since the preloading and counterweighing means also exert their full conjoint effect on the scale beam upon the latter arriving at its balance position corresponding to the deposition of 100 lbs. of weight in the hopper, which is to tend to hold the beam in its balance position (by resisting its movement from that position once it has settled therein), the provision of said means also makes it possible accurately to time the operation of a device or devices, such as the switch I, to occur at the precise instant of the beam coming to balance.

According to the invention, the switches H and I, whose timing may be accurately set as aforesaid, are connected in a control circuit exercising control function not only on the feeding means FM and its dribble gate 33, but also on the weigh-hopper gates 84, 85, and on re-cycling means for causing the weighing and dumping operations to be repeated at regularly recurring intervals, i. e. according to a predetermined time cycle. Such will now be described in connection with Fig. 7.

Motor M driving the feeder belt 18 is connected to three-phase 220 or 440 supply mains $L_1$, $L_2$, $L_3$ through a magnetic breaker E as conventionally used for starting and stopping a three-phase motor. The breaker E is operated (closed), thereby to connect the feeder motor M to the power supply mains $L_1$, $L_2$, $L_3$ by an operating coil Ec connected in an operating circuit fed by supply lines $L_1$, $L_3$ in series with a manually controlled "on-off" switch A, the normally open hopper "gates-closed" switch B, a normally closed switch $C_1$ of a time-delay relay C (which switch is under the influence of time-delay coil Ca forming part of said relay C) and normally closed switch $D_1$ of a relay D (which switch is under the influence of the relay coil Db). Supply mains $S_1$, $S_2$ provide a 110-volt single phase current for a control or supervisory circuit (adapted to be manually opened and closed by a switch Cs) for operating the time delay relay C and the relay D upon closing of the scale beam operated switch I. Mains $S_1$, $S_2$ also supply power under conditions to be described to the operating coils Fd and Ge of the aforesaid electrically operated dribble gate four-way control valve Fv and the weight hopper gates four-way control valve Gv, which latter, through air cylinders 36 and 90, control the position of the dribble gate 33 and hopper gates 84, 85.

The coil Fd for operating the dribble-gate control valve Fv is connected in series with the normally closed scale-beam operated switch H and a normally open auxiliary switch $E_4$ mounted in the magnetic breaker E to the supply mains $S_1$, $S_2$. Such switch $E_4$ closes in unison with the main breaker contacts $E_1$, $E_2$, $E_3$ under the influence of the aforesaid operating coil Ec. Coil Ge for operating the weigh hopper gates control valve Gv is supplied from mains $S_1$ and $S_2$ upon closing of normally open scale-beam control switch I, which latter is connected in series with the relay coil Db. When said coil is energized by closing of switch I, it closes normally open relay switch $D_4$, such resulting in energization of time delay relay coil Ca, the latter effecting opening of the normally closed switch $C_1$ and closing of the normally open switch $C_2$. When switch $C_2$ is closed, a circuit is completed through the aforesaid operating coil Ge.

Due to its time delay characteristic, time delay relay coil Ca maintains switch $C_2$ closed for a predetermined time period, i. e. one second, and also holds switch $C_1$ open for a corresponding time period. Accordingly, the magnetic-breaker operating circuit is opened and the feeder motor M is cut out for said predetermined time period, even though relay switch $D_1$ may reclose following the momentary energization of relay coil Db.

The operation of electrically controlled automatic weighing means as above, and which forms the weighing and dumping component of bagging apparatus according to the invention, is, briefly, as follows: Assume the apparatus is to bag 100 lb. weights of material following a period of shut-down, during which the compressed air supply to the air cylinders 36 and 90 has been turned off and all circuits are open. Also assume that with the dribble gate 33 fully raised, the weight of the particular material being weighed in suspension between the discharge end of the feeder belt 18 and the weight hopper WH at any instant is 10 lbs., and that the preloading spring 65 is adjusted to effect preloading of the scale beam 57 by the equivalent of 30 lbs. of deposited weight, whereby the beam will begin its movement towards balance position upon 70 lbs. of the material depositing in the weigh hopper. Also assume that the dribble gate has been adjusted to lower to a position such that, when lowered, it will reduce the volume of flow to one-fourth of the volume flowing in its full raised position.

Compressed air is turned on, such resulting in hopper gates 84, 85 moving to their closed position, due to the bias of the control valve Gv to feed air to the "gates-closed" end of the air cylinder 90, and such results in closing of micro-switch B. On-off switch A is now turned to "on" position and control circuit switch Cs is similarly closed, such resulting in: (a) completion of the magnetic breaker operating circuit and thereby energization of operating coil Ec and closing of the supply circuit to the motor M, and (b) energization of the operating coil Fd, which latter results in the dribble gate 33 moving to its full raised position. With motor M running and dribble gate 33 raised, material from the supply bin feeds to the weigh hopper at the full-volume flow rate.

Upon 70 lbs. of material depositing in the weigh hopper, scale beam 57 begins to rise to its balance position at the slow rate obtaining due to its preloading and corresponding counterweighting as aforesaid. The normally closed switch H has been previously adjusted so as to be engaged by the magnetic head 67 and thereby opened upon the beam arriving at a predetermined angular position during the course of its movement. Assuming this adjustment to be such that switch H is opened upon the beam completing two-thirds of its angular movement to balance position (corresponding to 90 lbs. of weight depositing) opening of the switch H results in deenergization of the aforesaid operating coil Fd, whereupon the dribble gate 33 lowers and immediately effects reduction in the volume of material spilling over the discharge end of the feeder belt 18 to one-fourth of its full volume. When this occurs, the material is "dribbled," i. e. supplied as a fine stream, to the weigh hopper, with the result that the beam moves throughout the final one-third of its angular movement to balance position at a further retarded rate.

Upon the scale beam 57 coming to balance position, switch I, which has been previously adjusted to close upon the beam arriving at such position, is closed by engagement therewith of the magnetic head 67, such resulting in: (a) opening of relay switch $D_1$, which latter breaks the operating circuit to the magnetic contactor which opens to cut out the feeder motor M, and (b) closing of relay switch $D_4$, energization of time delay relay coil Ca, with consequent opening of switch $C_1$ and closing of switch $C_2$ thereof. As above explained, closing of switch $C_2$ completes a circuit through the operating coil Ge and thereby actuation of the valve Gv to its "gates-open" position, whereupon the weigh hopper gates 84, 85 partake of their quick-opening movement, resulting in quick dumping of the weigh hopper WH.

As also previously explained, the time delay characteristic of the time delay relay coil Ca results in the switch $C_1$ being held open for a predetermined time interval, i. e. one second, during which the feeder motor M is completely cut out of operation. This period of motor cut-out obtains even though scale-beam controlled switch I closes only momentarily, which in practice is the case, since scale beam 57 lower from its balance position at the instant that the weigh-hopper dumping is initiated. Upon the elapse of said predetermined time period, the holding function of the time delay relay coil Ca terminates, whereupon switch $C_1$ re-closes and switch $C_2$ re-opens. Since compressed air is turned on, the hopper gates 84, 85 return to their closed position, resulting in closing of the micro-switch B. All the operating circuit switches A, B, $C_1$ and $D_1$ are now closed as with the beginning of the cycle, and hence the cycle repeats itself and continues to repeat at regularly recurring intervals so long as the "off-on" switch A is in the "on" position and the air supply is turned on.

It will be observed from the above that the duration of the cycle is determined by the time required to complete a weighing and dumping operation, plus the period of deenergization of the feeder motor M as established by the delay characteristic of the time delay relay coil Ca. By initially feeding the material at a fast rate to the hopper, in conjunction with precise control of the weighing operation as the material approaches final weight, as explained above, and further by effecting quick dumping of the weigh hopper, the weighing and dumping time is short as compared to that attainable with prior automatic weighing means, and without any sacrifice to accuracy, since accuracy in weigh does not depend to any appreciable extent on the speed with which the apparatus is operated. That is to say, the same degree of accuracy can be obtained in weighing at a fast rate as in weighing at a slow rate. As an example of the fast weighing and dumping rate, 100 lbs. weights of fertilizer (a difficult material to handle) can be comfortably weighed and dumped in two seconds, which, adding a one-second pause between each two such weighing and dumping operations, represents a three-second cycle, or twenty weighing operations per minute. At this point, it should be explained that the figures given above, in connection with the preloading effect of the preloading spring 65, the weight of material in suspension, the cut-out point of switch H in terms of beam movement are illustrative only and are given solely for the purpose of simple disclosure of the principles of the invention, since such figures vary with different materials, their weight per unit volume, their permissible rate of feed, the desired weighing rate, and similar factors.

The same fast-weighing rate and close control of weight and thereby the exceptional accuracy in weight attainable with weighing and dumping means operating as aforesaid is also possible through use of the variant control arrangement of Fig. 6. According to such arrangement, the switches HP and IP function similarly to the previously described switches H and I, since the pointer 78 of a visible weight-indicating means associated with the scale beam and which includes said pointer and an associated chart 78a for indicating over-under weight with respect to a zero or balance point marking appearing on the chart, moves proportionally to the scale beam 57a, and the switches HP and IP, which may be simple mercury switches, are timed so that they perform the same function as do the previously described switches H and I.

When bagging bulk materials of such low density, i. e. low weight per unit of volume, for example, peanut hulls, seeds and the like, that the weight of material in suspension between feeder belt 18 and weigh hopper WH is not appreciable, the preloading and counter-weighting features insuring that the scale beam 57 begins its movement at an earlier breaking point than is usual may be omitted, and the dribble gate, instead of moving from full open to a partly closed or "throttling" position, may move from its full open to a full closed position, thereby functioning similarly to an "open and shut" valve. According to such arrangement, the scale beam begins its movement at the usual breaking point of any scale, i. e. about 97 or 98 lbs. of deposited weight in case of the scale being set to weigh 100 lb. weights. Opening of the beam-controlled switch H (or pointer controlled switch HP) is timed to occur upon beam movement being initiated, such resulting in the dribble gate 33 lowering to full closed position in which it completely cuts off feed of material over the discharge end of the feeder belt 18. However, as the material in suspension between the feeder belt and the weigh hopper deposits in the latter, the beam moves to its balance position under the weight thereof, whereupon switch I (or the corresponding pointer switch HP) is closed, as previously described, thus to cut the feeder motor M out of operation. Hence, according to this arrangement, full closing of the dribble gate is in effect timed to occur at the instant which anticipates the weight of the material in suspension, which is utilized to bring the weight of material depositing in the hopper to final weight. While some material may build up on the feeder belt 18 in the interval between gate-lowering and cut-out of the motor M, this time interval is so short, due to "fast" beam action, that the material build-up is of no consequence. The circuitry employed in the arrangement omitting the preloading and counter-weighting means may of course be the same as that illustrated in Fig. 7.

It will be observed that according to all of the above described arrangements the dribble gate operates "on weight," that is to say, the dribble gate lowers to an intermediate or throttling position, or to its full closed position, upon a certain weight of material depositing in the weigh hopper WH, as is reflected by movement of the weigh beam 57 (or 57a). I have discovered that it is possible to obtain accurate weight of the heavier or high density materials when weighing at the fast rate (three-second cycle) as described above, similarly without any pre-loading or counterweighting of the scale beam as described above in connection with the lighter weight or low density materials. This desirable result is made possible by operating the dribble gate 33 "on time," that is to say, by lowering the gate to an intermediate or throttling position, as with the Fig. 3 type control, a predetermined period following the instant of the feeder motor M being placed in operation as results in the deposition of a calculated underweight of material in the hopper, and a stretching out of the further time required to bring the scale beam to its balance position responsively to material falling to it at the reduced flow rate resulting from lowered dribble gate position. This can be explained by the following example: If we assume that in weighing 100 lbs. of material, and with the feeder delivering the material to the hopper at a constant full volume rate such that 90 lbs. of material will deposit in the hopper in 1¼ seconds, or at the rate of 18 lbs. per ¼ second, then it follows that the 9 lbs. of the remaining 10 lbs. required to bring the beam to its balance position will deposit in ⅛ second. However, if the volume of flow is reduced to one-fourth normal flow, four times that time, or approximately ½ second, will be required to deposit said 9 lbs. to the hopper, thus to bring the weight of the material in the hopper up to 99 lbs. If we further assume that the weight of the material in suspension between the discharge end of the feeder conveyor and the weigh hopper at the instant of feeder motor cut-out, and with the dribble gate 33 in full open position, is 4 lbs., then it follows that the weight of material in suspension, with the dribble gate only one-fourth open, will be 1 lb. Thus, adding the 90 lbs. of weight depositing with the dribble gate in full raised position in 1¼ seconds, the 9 lbs. added in the ½ second during which the dribble gate is lowered, and the 1 lb. of material in suspension upon the feeder being cut out of operation, we have the total of 100 lbs. of weight depositing in 1¾ seconds. By suitable adjustment of the timing of the gate lowering operation and of the amount of gate opening in the lowered position of the gate, the weighing time may be reduced even further, it being understood that the figures given above are illustrative and for purpose of simple explanation.

The electrical controls employed in operating the dribble gate 33 "on time" as described above are illustrated in Fig. 8, wherein the circuitry is generally that illustrated in Fig. 7, with the following exceptions:

For the auxiliary switch E4 (Fig. 7) is substituted the normally closed auxiliary switch EX4, which is opened when the operating coil EXc is energized. Also, the scale-beam operated switch H (Fig. 7) is eliminated and a time delay relay DX is substituted therefor. Said relay includes a coil DX$b$ having a time delay characteristic and which is in series with the normally closed switch or contact EX4, and a normally open switch DX1 under the influence of said coil. At this point, it will be observed that, as with the dribble gate four-way control valve F$v$ being normally biased to feed air to the "gate-lowered" position, the corresponding valve FX$v$ employed in the Fig. 8 hook-up is normally biased to a position in which it feeds air to the "gate-lowered" end of the air cylinder 36.

The operation of electrically controlled automatic weighing means according to the modified circuitry illustrated in Fig. 8 is briefly as follows: Assume, as heretofore, the apparatus is set up to bag 100 lb. weights of material following a period of shut-down. Compressed air is turned on, such resulting in the hopper gates 84, 85 moving to their closed position and dribble gate 33 lowering to a one-fourth open position in which it reduces normal volume of flow to one-fourth of that obtaining when the gate is fully raised. In a preliminary operation, the control circuit switch CX$s$ is closed, such completing a circuit through the time delay relay coil DX$b$ and the normally closed auxiliary switch EX4. Switch DX1 closes, thus completing a circuit through the operating coil FX$d$ for the dribble gate control valve FX$v$, such resulting in the dribble gate 33 moving to its full raised position. "On-off" switch A is immediately turned to "on" position whereupon the feeder motor M is energized and auxiliary switch EX4 opens. Although opening of the switch EX4 deenergizes the coil DX$b$, its time delay characteristic comes into play to maintain the switch DX1 closed for a predetermined time period, with the result that the dribble gate is held in its full open position for such time period. The time delay characteristic of the coil DX$b$ is adjusted to maintain the switch DX1 closed and the dribble gate 33 raised, following opening of auxiliary switch EX4 for such period of time as results in the feeding mean FM depositing 90 lbs. of weight in the weigh hopper WH, as per the example given above. When this period of time runs out, switch DX1 opens and deenergizes the operating coil FX$d$ of dribble-gate control valve FX$v$, whereupon the dribble gate 33 lowers to its one-fourth open position, as above.

Lowering of the dribble gate results in the material depositing in the hopper in a much finer stream and hence at slower rate than with the dribble gate full-open, with the result that the scale beam 57 moves to its balance position at a correspondingly retarded rate. By proper timing, the scale beam effects closing of the normally open switch IX just prior to the final or predetermined weight of the material depositing in the hopper (99 lbs. according to the example given above). When switch IX closes, a circuit is completed through the time delay relay coil CX$a$ (functioning similarly to the relay coil C$a$ of the Fig. 7 circuit), and accordingly switch CX1 is opened and switch CX2 is closed. Closing of the latter switch completes a circuit through the operating coil GX$e$ which, it will be recalled, actuates the weigh hopper gates control valve GX$v$ to a position in which it feeds air to the "gates-opened" end of the air cylinder 90. Consequent to opening of the switch CX1, the feeder motor M is cut out of operation for a predetermined interval of time established by the time delay characteristic of coil CX$a$, as previously described in connection with Fig. 7, also resulting in the auxiliary switch EX4 reclosing, whereupon dribble gate 33 returns to its full raised position, as aforesaid. Since energization of the coil GX$e$ is but momentary, the weigh hopper gates 84, 85 following their opening immediately reclose, thus conditioning the apparatus for the next weighing operation. Such next operation is initiated automatically upon the elapse of the time interval established by the time delay characteristic of the coil CX$a$ as previously described, with the cycle repeating itself so long as a supply of material is maintained in the supply hopper and/or compressed air is turned on.

When operating in accordance with the Fig. 8 form of control, the scale-beam control switch IX may take the form of a conventional micro-switch mounted as illustrated in Fig. 9. As shown, said switch is adjustable as to its elevation by the same form of mounting and adjusting means illustrated in Fig. 3, with the micro-switch being secured directly to the vertical leg of the L-shaped strap 70. As further shown in Fig. 9, the scale beam 57$c$ is preferably provided at its free end with a micro-switch operating bar 67$c$ having substantial lateral width, thus to insure engagement with the micro-switch operating arm I$a$, even though the scale beam may partake of some lateral movement.

The above described mode of operation according to which the dribble gate 33 operates both "on time" and in such manner as to supply a reduced volume of the material in the form of a fine stream as the weight in the hopper approaches final weight is of advantage when transferring from one-density material to another, as frequently occurs when bagging different brands of material such as fertilizer, without readjusting the apparatus. Since under the conditions outlined above, the material is brought to final weight under a fine stream of material depositing in the hopper, it follows that the weight of the fine stream of material in suspension at the instant of feeder cut-off does not vary appreciably, even though the variation might be appreciable in the case of a full volume stream continuing to deposit at the instant of feeder cut-out. In explanation, if we assume the difference in weight between two columns of different brand materials in suspension between feeder belt 18 and the weigh hopper to be 1 lb., this weight difference is reduced to 4 oz., if the volume of the material columns is reduced to one-quarter of their original volume. It becomes obvious therefore that by judicious reduction in the volume of flow, through control of the lowered position of the dribble gate 33, variations in weight occurring due to different density of successive runs of material being weighed can be made so small as not appreciably to affect the final weight.

In prior bagging methods, and particularly those methods requiring the operator to clamp and unclamp the bags to and from the scale so as to provide the scale receptacle, and to only a lesser extent in prior bagging methods employing automatic weighing equipment, the over-all bagging rate was fixed by the operator's time required to condition and/or affix the bags to the scale in position to receive the weighed material and/or in handling the bag after its filling. When weighing at the fast rate made possible by the weighing and dumping means described in the foregoing, it becomes obvious that the prior schemes for conditioning and clamping the bag for filling and for handling it following filling are wholly unacceptable. Therefore, it is a feature of the present invention that all such operations are eliminated and, instead, that the operator is required only to perform the simple operations of conditioning the bag for receiving the material discharging through the bag spout BS, i. e. picking up a bag and opening, and thereupon of slipping the open mouth thereof over the spout and holding the bag in position on the spout so that it hangs clear of the bag conveyor BC. For this purpose, the spacing between the lower edge of the bag spout and the upper receiving surface of the conveyor is such that the bag may be comfortably held by hand, at a level such that the spout extends a short distance into the bag and the bottom edge of the latter is slightly raised from the conveyor surface, all as indicated in Fig. 10. It is a further important feature of the present method that the operator does not attempt to hold the bag on the spout against the weight of the material striking the same, but, on the other hand, he holds the bag so lightly that the weight of the material depositing in the bag pulls it away from the spout and drops it to the conveyor BC. While the operator's hands may lower with the bag, such is not even necessary, as he may release the bag immediately upon the material striking the same. Alternatively, he may permit his hands to lower with the bag and thereby supply some steadying effect thereto. In either case, the bags drops with a fast action, since the opening of the weigh hopper gates 84, 85 takes place so quickly that the material contained in the hopper falls through the spout and strikes the bottom of the bag as a fast-moving slug, which acts automatically to drop the bag from the spout and lower it to the conveyor as explained above.

By reference to Fig. 10, it will also be seen that the operator holds the bag to the spout BS in such manner that at least a portion of the open mouth of the bag is spaced from the spout. As a consequence, free egress of the air within the bag is permitted as the slug of material deposits therein. This feature, taken with the fact that the rate of fall of the slug of material is not substantially retarded by its striking on the bag bottom so that the slug in effect impacts on the conveyor surface, of course, results in any air entrained in the material of the slug being driven therefrom and also in the material of the slug being compacted within the bag.

As will be understood, the bag conveyor BC is powered so that immediately upon the bag dropping to same it is moved from beneath the spout, thus clearing the space between spout and the conveyor for the next bag. The rate of conveyor travel is of course adjusted to the rate at which the bagging operation is carried out, to effect such clearance. Although not shown, the filled bag is moved to a stitching machine disposed alongside the conveyor, by which sewing of its open mouth is effected, with the result that a continuous flow of filled closed bags is delivered from the discharge end of the conveyor. If considered necessary, a vertically disposed side board 100, as illustrated in Fig. 10, may be positioned along one side of the conveyor, against which the bags may be tipped by the operator as his hands move downwardly with the bag dropping to the conveyor. However, when bagging the larger-weight bags, they are usually sufficiently stable under the substantial weight of the material striking the bottom thereof that no side board is necessary to maintain them in the vertical position in which they drop to the conveyor.

To illustrate the speed with which bags may be conditioned for receiving their weights of material and placed on the bag spout BS, the bags may be successively taken from a pile or stack thereof disposed in position readily accessible to the operator, opened up, and placed on the spout BS quite comfortably in the 2½ seconds transpiring between the completion of one dumping operation and the beginning of the next dumping operation, such assuming a 3-second cycle in which 1½ seconds is allotted to weighing, ½ second to dumping, with a 1-second interval transpiring between the completion of one dumping operation and the beginning of the next weighing operation.

The aforesaid vertical spacing between bag spout BS and bag conveyor BC, taken with the appreciable vertical dimension of the bag spout, provides for normal variation in the height of bags of the same size (weight) occurring because of different bag makers' specifications, since the bags may be positioned "high" or "low" on the bag spout. To adapt the bagging apparatus to different sizes of bags, i. e. 5 lbs. to 200 lbs., or even greater, the bag spout may be of vertically extensible construction, or, as shown, the bag spout may be formed separate from the chute CH and secured thereto by quick-detachable connecting means generally indicated at 102 (Fig. 1). By this arrangement, a spout of the proper axial length for the particular size of bag being filled at any given time may be quickly attached to the chute CH and replaced by one of another axial length, as required.

Although not shown because they are well known, additional features of practical advantage may be and preferably are incorporated into the illustrated bagging apparatus. For example, as the scale mounting is such as to make it possible to completely enclose the scale, it is preferably housed in a scale housing carried by the top frame 13. A lower enclosure extending between the top and intermediate frames 13, respectively, may be provided to enclose the open end of the weigh hopper, the hopper gates 84, 85 and the operating mechanism therefor, thereby to keep dust within the apparatus, so to speak. For certain materials it may be advisable to mount an encircling dust collar on the lower end of the chute CH or on the upper end of the bag spout or spouts, which function to keep dust rising from the bags in the course of their filling from reaching the level of the operator's face. Suction means for drawing off dust arising from the weighing and dumping operations may also be supplied with the apparatus in installations where such is considered necessary or advisable.

I claim:

1. A method of bagging bulk materials which comprises the steps of supplying a succession of measured quantities of material in the form of fast-moving slugs falling by gravity at substantially regularly spaced intervals from a generally vertical spout disposed above a horizontal supporting surface, in the interval between each two successive supplying operations applying an open-mouth bag to the spout in position to receive the next slug of material falling therefrom, and thereupon holding said bag in said position with a force which is insufficient to withstand the impact of the slug striking the same, whereby the bags fall away from the spout and drop to said supporting surface responsively to the slugs being received in the bags, and removing the filled bags as they drop to the supporting surface thereby to clear the space beneath the spout for the next bag-filling operation.

2. A method of bagging bulk materials as set forth in claim 1, wherein the bags are applied to the spout and held as aforesaid solely by hand.

3. A method of bagging bulk materials as set forth in claim 1, wherein said bags are applied to the spout and held as aforesaid solely by hand, and wherein the supporting surface to which the filled bags drop is movable at a rate such as to maintain the space below the spout clear of filled bags.

4. A method of bagging bulk materials as set forth in claim 1, wherein the bags are held to the spout with at least a portion of their open mouths spaced from the spout thereby to permit free egress of air from the bags as the slugs deposit therein.

5. A method of bagging bulk materials, which comprises the steps of supplying a succession of measured quantities of material in the form of fast-moving slugs which fall by gravity at substantially regularly spaced intervals from a generally vertical spout, in the interval between each two successive supplying operations applying an open-mouth bag to the spout in position to receive the next slug of material falling therefrom and at a level such that it hangs clear of a bag-supporting surface disposed a predetermined distance below the spout, thereupon holding said bag with a force which is insufficient to withstand the impact of the slug striking the same, whereby the bags automatically drop from the spout to said supporting surface responsively to the slugs being received in the bags, and removing the filled bags as they drop to said supporting surface thereupon to clear the space between the spout and said supporting surface for the next bag-filling operation.

6. A method of bagging bulk materials as set forth in claim 5, wherein the bags are applied to the spout and held as aforesaid solely by hand.

7. A method of bagging bulk materials as set forth in claim 5, wherein the bags are applied to the spout and held as aforesaid solely by hand, and wherein the supporting surface to which the filled bags drop is movable at a rate such as to effect removal of a filled bag from beneath the spout prior to the next bag dropping to said supporting surface.

8. A method of bagging bulk materials as set forth in claim 5, wherein the bags are held to the spout with at least a portion of their open mouths spaced from the spout thereby to permit free egress of air from the bags as the slugs deposit thereon.

9. The method of bagging bulk materials which comprises the steps of weighing at substantially regularly spaced intervals a succession of predetermined weights of material in a weigh chamber dumping to a generally vertical discharge spout disposed above a supporting surface, dumping the weigh chamber responsively to the completion of each weighing operation and at a rate such that the predetermined weighs of material discharge from the spout in the form of fast-falling slugs, in the interval between each two weighing operations applying an open-mouth bag to the spout in position to receive the slug of material falling therefrom, and thereupon holding said bag in said position with a force which is insufficient to withstand the impact of the slug striking the same, whereby the bags fall away from the spout and drop to said supporting surface responsively to the slugs being received in the bags, and removing the filled bags dropping to the supporting surface at a rate such as to clear the space beneath the spout for the next bag-filling operation.

10. The method of bagging bulk materials which comprises the steps of weighing at substantially regularly spaced intervals a succession of predetermined weights of material in a weigh chamber dumping to a generally vertical discharge spout disposed above a supporting surface, dumping the weigh chamber responsively to the completion of each weighing operation and at a rate such that the predetermined weights of material discharge from the spout in the form of fast-falling slugs, in the interval between each two successive weighing operations placing an open-mouth bag on the spout in position to receive the next slug of material falling therefrom and holding said bag at a level such that it hangs clear of the supporting surface and with a force which is insufficient to withstand the impact of the slug striking the same, whereby the bags automatically drop from the spout to said supporting surface responsively to the slugs being received in the bags, and removing the filled bags dropping to said supporting surface at a rate required to clear the space beneath the spout for the next bag-filling operation.

References Cited in the file of this patent

UNITED STATES PATENTS

| Number | Name | Date |
|---|---|---|
| 578,159 | Richards | Mar. 2, 1897 |
| 694,222 | Wertenbruch | Feb. 25, 1902 |
| 1,152,868 | Zanone | Sept. 7, 1915 |
| 1,628,179 | Nelson | May 10, 1927 |
| 1,851,017 | Middelboe | Mar. 29, 1932 |
| 1,990,265 | Bryce | Feb. 5, 1935 |
| 1,994,797 | Thomas | Mar. 19, 1935 |
| 2,050,314 | Grunewold | Aug. 11, 1936 |
| 2,055,730 | Rees | Sept. 29, 1936 |
| 2,111,921 | Bleam | Mar. 22, 1938 |
| 2,314,654 | Merrifield | Mar. 23, 1943 |
| 2,317,865 | Talbot | Apr. 27, 1943 |
| 2,319,193 | Walter | May 11, 1943 |
| 2,502,380 | Howard | Mar. 28, 1950 |
| 2,564,544 | Richardson | Aug. 14, 1951 |
| 2,605,075 | Brown | July 29, 1952 |
| 2,610,726 | Howard | Sept. 16, 1952 |
| 2,613,053 | Dorrington | Oct. 7, 1952 |
| 2,616,603 | Haugen | Nov. 4, 1952 |
| 2,634,082 | Knobel | Apr. 7, 1953 |

FOREIGN PATENTS

| Number | Country | Date |
|---|---|---|
| 314,525 | Great Britain | Mar. 6, 1930 |